(12) United States Patent
Schuhmann

(10) Patent No.: US 8,597,796 B2
(45) Date of Patent: Dec. 3, 2013

(54) FLUSHABLE MULTILAYER FILM

(75) Inventor: Michael Schuhmann, Grosshabersdorf (DE)

(73) Assignee: Huhtamaki Films Germany GmbH & Co. KG, Forchheim (DE)

( * ) Notice: Subject to any disclaimer, the term of this patent is extended or adjusted under 35 U.S.C. 154(b) by 0 days.

(21) Appl. No.: 13/161,019

(22) Filed: Jun. 15, 2011

(65) Prior Publication Data

US 2011/0268938 A1 Nov. 3, 2011

Related U.S. Application Data

(63) Continuation of application No. PCT/EP2009/009015, filed on Dec. 16, 2009.

(30) Foreign Application Priority Data

Dec. 18, 2008 (DE) .................. 10 2008 063 520

(51) Int. Cl.
| | | |
|---|---|---|
| *B32B 27/30* | (2006.01) | |
| *B32B 27/06* | (2006.01) | |
| *B32B 27/08* | (2006.01) | |
| *B32B 27/36* | (2006.01) | |
| *B32B 1/02* | (2006.01) | |

(52) U.S. Cl.
USPC ........ 428/522; 428/35.2; 428/35.7; 428/36.4; 428/36.6; 428/500; 428/480

(58) Field of Classification Search
USPC .......... 428/34.1, 34.4, 34.6, 34.7, 35.2, 35.4, 428/35.7, 36.4, 36.6, 36.7, 500, 515, 519, 428/520, 521, 522, 480
See application file for complete search history.

(56) References Cited

U.S. PATENT DOCUMENTS

| | | | | |
|---|---|---|---|---|
| 5,429,874 | A | * | 7/1995 | VanPutte ...................... 428/522 |
| 2005/0010010 | A1 | | 1/2005 | Kitamura et al. |
| 2009/0301382 | A1 | * | 12/2009 | Patel ............................ 116/201 |

FOREIGN PATENT DOCUMENTS

| | | |
|---|---|---|
| CN | 13 63 628 A | 8/2002 |
| EP | 05 13 692 A1 | 11/1992 |
| EP | 1 043 361 A1 | 10/2000 |
| EP | 0 613 362 B1 | 7/2002 |
| WO | 92/01556 A1 | 2/1992 |
| WO | 93/08095 A1 | 4/1993 |
| WO | 93/09740 A1 | 5/1993 |

OTHER PUBLICATIONS

International Search Report Dated Mar. 24, 2010.
German Search Report Dated Oct. 13, 2009.

* cited by examiner

*Primary Examiner* — Walter B Aughenbaugh
(74) *Attorney, Agent, or Firm* — Norris McLaughlin & Marcus PA

(57) ABSTRACT

Multilayer film, comprising an at least flushable, thermoplastic layer composite made of at least one layer which is at least comminutable via exposure to water and is resistant to cold water or can only be dissolved slowly therein, formed of at least one at least partially saponified polyvinyl acetate having a layer thickness of <10 μm, and at least one layer soluble in cold water comprised of at least one at least partially saponified polyvinyl acetate and at least one substance that increases the water solubility, selected from the group consisting of biodegradable polymers, surfactants, inorganic pigments and fillers, and flushable packages produced therefrom.

20 Claims, No Drawings

FLUSHABLE MULTILAYER FILM

This application is a continuation of PCT/EP2009/009015 filed 16 Dec. 2009 (international filing date), still pending.

The present invention relates to a multilayer film encompassing an at least flushable, thermoplastic layer composite made of at least one layer which is at least comminutable via exposure to water and which is resistant to cold water or can undergo delayed dissolution therein, and which is based on at least one at least partially hydrolyzed polyvinyl acetate with layer thickness <10 µm, and at least one cold-water-soluble layer based on at least one at least partially hydrolyzed polyvinyl acetate and at least one substance that promotes solubility in water, selected from the group consisting of biodegradable polymers, surfactants, and inorganic pigments and fillers, and also to packaging produced from said multilayer film, and to constituents of hygiene products.

BACKGROUND OF THE INVENTION

Packaging made of flushable multilayer films is known in the prior art, where the layers of said films have different solubility in water. If humidity and temperature are excessive, or if an excessively high level of contact moisture is present, e.g. moisture from the hand, the external surface layer which has lower water-solubility in these known films tends to block and (to some extent) to dissolve, and consequently the layer which is located thereunder and which is protected by the surface layer and which has better water solubility is attacked, with resultant premature breakdown of the layer composite. Films of this type therefore have only limited shelf life and certain precautionary measures are required when handling them, for example use of gloves.

EP 0 613 362 B1 attempts to solve said problem by producing a two-layer film which is resistant to ambient moisture, and the respective layers of which have different solubility in water. One of the layers is composed of cold-water-soluble polyvinyl alcohol and can be dissolved completely within one minute by stirring in water. The other layer is composed of hot-water-soluble polyvinyl alcohol, and can be dissolved under said conditions but only with a delay so great that it is classified as non-flushable for the purposes of the present invention.

However, there is a need for multilayer films which are relatively resistant to ambient moisture but at least water-flushable. In particular, there is a need for flushable packaging made of multilayer films of this type which, on water-flushing, e.g. toilet-flushing, do not cause blockages in outflows or in drainage or sewer pipes.

It was therefore an object of the present invention to provide a flushable multilayer film which is relatively resistant to ambient moisture, and a corresponding flushable packaging material and, respectively, packaging for a very wide variety of applications, made of said multilayer film.

SUMMARY OF THE INVENTION

This object is achieved via provision of the multilayer film of the invention, encompassing an at least flushable, thermoplastic layer composite made of A) at least one layer which is at least comminutable via exposure to water and which is resistant to cold water or can undergo delayed dissolution therein, and which is based on at least one at least partially hydrolyzed polyvinyl acetate with layer thickness <10 µm, and B) at least one cold-water-soluble layer based on at least one at least partially hydrolyzed polyvinyl acetate and at least one substance that promotes solubility in water, selected from the group consisting of biodegradable polymers, surfactants, and inorganic pigments and fillers.

DETAILED DESCRIPTION

For the purposes of this invention, the expression "cold" implies a temperature of at most 25° C.

For the purposes of the present invention, the expression "cold-water solubility" and, respectively, "cold-water-soluble" implies the dissolution of a material or of a layer in water with a temperature of at most 25° C. within two minutes.

This implies that the loss of structure of a cold-water-soluble layer is observable within two minutes.

For the purposes of this invention, the expression "resistant to cold water" implies that a material or a product, e.g. the layer A) of the multilayer film of the invention, does not dissolve or, respectively, lose its structure under the "cold-water solubility" conditions stated above.

For the purposes of this invention, the expression "can undergo delayed dissolution" implies that a material or a product, e.g. the layer A) of the multilayer film of the invention, does not dissolve in water with a temperature of at most 25° C. until preferably at least two minutes have passed. This implies that a layer that can undergo delayed dissolution in cold water does not lose its structure until at least two minutes have passed.

For the purposes of this invention, the expression "comminutable" implies that a material or a product, e.g. the layer A) of the multilayer film of the invention, can, through exposure to water, e.g. exposure to a water-flush, be at least comminuted to give particles which are water-flushable.

For the purposes of this invention, the expression "flushability" or "flushable" implies that a material or a product, in particular the multilayer film of the invention or packaging derived therefrom, can, through exposure to water, e.g. exposure to a water-flush of a conventional toilet, be discarded by flushing into the outflow and onward into the drainage or sewer pipes, with no resultant blockage.

A material or product, in particular the multilayer film of the invention, or an item or packaging derived therefrom, is therefore flushable if it is at least to some extent water-soluble or, respectively, is comminutable through exposure to water, e.g. a water-flush, in particular a toilet-flush, at least to give particles such that there is no blockage either of the outflow of a conventional toilet or of attached pipelines, or of any pumping system.

The method for flushability testing is set out in detail in the context of the examples.

In the present invention, layer A) is at least comminutable to give flushable particles on exposure to water, preferably to a water-flush, where the size of the particles is preferably <10 mm.

The degree of hydrolysis of the partially hydrolyzed polyvinyl acetates used to produce the layer A) and/or layer B) is preferably from 50 to 98 mol %.

It is preferable that the partially hydrolyzed polyvinyl acetates used for producing the layers A) and, respectively, B) have a different degree of hydrolysis.

It is particularly preferable that the degree of hydrolysis of the partially hydrolyzed polyvinyl acetates used for producing the layer A) is from 85 to 98 mol % and that they are preferably resistant to cold water or can only undergo delayed dissolution therein.

It is particularly preferable that the degree of hydrolysis of the partially hydrolyzed polyvinyl acetates used for producing the layer B) is from 70 to 95 mol %, and that they are preferably cold-water-soluble.

Partially hydrolyzed polyvinyl acetates are obtained via incomplete hydrolysis of polyvinyl acetates (PVAs), and the partially hydrolyzed polymer therefore has not only ester groups but also hydroxy groups.

Fully hydrolyzed polyvinyl acetates (polyvinyl alcohols) are practically completely hydrolyzed polyvinyl acetates and their degree of hydrolysis is ≥98 mol %.

The melt index (or melt flow index, MFI) of the at least partially hydrolyzed polyvinyl acetates on which layer A and/or layer B is/are based is preferably in the range from 0.01 to 45 g/10 min (190° C./21.6 kg, determined to ISO 1133), where the MFI of the at least partially hydrolyzed polyvinyl acetate which is present as main component in the layer A) is preferably in the range from 0.5 to 10 g/10 min (190° C./21.6 kg, determined to ISO 1133), and the MFI of the at least partially hydrolyzed polyvinyl acetate of the layer B) is preferably in the range from 15 to 45 g/10 min (190° C./21.6 kg, determined to ISO 1133).

The at least partially hydrolyzed polyvinyl acetates used for producing the layer A) and/or layer B) can comprise processing aids, such as plasticizers, preferably polyols, particularly preferably glycerol. The at least partially hydrolyzed polyvinyl acetates preferably comprise at most 25% by weight of these processing aids.

A preferred suitable material for producing the layer A) that is at least comminutable via exposure to water, for example a water-flush, and is resistant to cold water or can undergo delayed dissolution therein, and which is present in the multilayer film of the invention, is at least one fully hydrolyzed polyvinyl acetate, at least one partially hydrolyzed polyvinyl acetate, a mixture made of at least two differently partially hydrolyzed polyvinyl acetates, or a mixture made of at least one partially hydrolyzed polyvinyl acetate and of at least one fully hydrolyzed polyvinyl acetate.

The thickness of the layer A) is preferably from 1 µm to 9 µm, with preference from 3 µm to 5 µm.

Layer A) preferably forms one of the surface layers of the multilayer film of the invention which is external during use of the layer composite of the invention.

In one preferred embodiment, the layer composite of the multilayer film of the invention comprises a further layer A) which is immediately adjacent to layer B), so that the layer B) has a layer A) at each of its surfaces. It is preferable that said further layer A) also forms one of the surface layers of the multilayer film of the invention.

A preferred suitable material for producing the cold-water-soluble layer B) is at least one partially hydrolyzed, preferably cold-water-soluble polyvinyl acetate, or a mixture made of at least two differently partially hydrolyzed, preferably cold-water-soluble polyvinyl acetates.

It is preferable that the thickness of the layer B) is from 5 µm to 200 µm, particularly from 10 to 150 µm, very particularly from 20 to 100 µm.

In one preferred embodiment, the layer B) comprises at least 50% by weight, preferably at least 60% by weight, particularly preferably 80% by weight, based in each case on the total weight of the layer B), of at least one partially hydrolyzed polyvinyl acetate.

In another preferred embodiment, the layer B) comprises from 0.1 to 50% by weight, preferably from 1 to 40% by weight, based in each case on the total weight of the layer B), of at least one substance that promotes solubility in water, selected from the group consisting of biodegradable polymers, surfactants, and inorganic pigments and fillers.

The layer B) preferably comprises from 1 to 5% by weight of at least one surfactant, and/or from 5 to 30% by weight of at least one substance that promotes solubility in water, selected from the group consisting of biodegradable polymers, and inorganic pigments and fillers, based in each case on the total weight of the layer B).

Biodegradable polymers that promote solubility in water and that can be used are preferably lactic acid (ester) homo- or copolymers, preferably based on L-lactide and/or D-lactide, polyhydroxyalkanoates (PHAs), starch, cellulose, cellulose derivates, polyesters, preferably polyesters derived from lactones, for example from polycaprolactones (PLCs), polyethers, and ethylene-vinyl alcohol copolymers and mixtures made of at least two of the abovementioned polymers.

Biodegradable polymers in the invention are biopolymers which are compostable, and which therefore dissolve in water or are completely degraded to DIN EN 13432.

Particularly preferred inorganic pigments and fillers that promote solubility in water are pigments and fillers selected from the group consisting of silicates, carbonates, preferably alkali metal carbonates, alkaline earth metal carbonates and ammonium carbonate, and oxides, preferably transition metal oxides and other metal oxides.

Preferred silicates that can be used are silicates selected from the group consisting of alkali metal silicates and alkaline earth metal silicates.

Surfactants used that promote solubility in water can preferably be surfactants selected from the group consisting of cationic, anionic, nonionic, and amphoteric surfactants.

Cationic surfactants used usually have at least one positively charged functional group such as a quaternary ammonium group. Preferred cationic surfactants are quaternary alkyl- and arylammonium halides (inclusive of mixed alkyl- and arylammonium halides), e.g. distearyldimethylammonium chloride, benzethonium chloride, or dequalinium chloride.

Anionic surfactants used preferably have at least one negatively charged functional group such as a carboxy, sulfone, or sulfate group.

The anionic surfactants are preferably those selected from the group consisting of salts of alkylcarboxylic acids, alkylbenzenecarboxylic acids, alkylsulfonic acids, alkylbenzenesulfonic acids, and also sulfuric monoesters of fatty alcohols.

Nonionic surfactants used are preferably those selected from the group consisting of fatty alcohol alkoxylates, fatty acid amides, fatty acid esters, alkyl(poly)glycosides, and alkylphenol alkoxylates.

Amphoteric surfactants used preferably have not only at least one negatively charged functional group but also at least one positively charged functional group and are preferably those selected from compounds which have at least one quaternary alkyl- or arylammonium group (inclusive of mixed alkyl- and arylammonium groups) and one carboxy group or sulfone group or sulfate group, examples being betaines or sultaines.

The layer A) can also optionally comprise at least one of the abovementioned substances that promote solubility in water, selected from the group consisting of biodegradable polymers, surfactants, and inorganic pigments and fillers, preferably from 5 to 35% by weight, based on the total weight of the layer A), if this is necessary in order to achieve the flushability defined in the invention.

In one preferred embodiment, the layer composite of the multilayer film of the invention comprises a further layer B) immediately adjacent to layer B), so that layer B) has a layer A) and, respectively, a layer B) at its surfaces. It is preferable that the two layers B) have an identical structure and, for reasons stemming from production technology, are within the structure of the multilayer film of the invention.

Any desired production processes, e.g. lamination, extrusion, and preferably coextrusion, can be used to produce the layer composite of the multilayer film of the invention and optionally to produce further layers.

Extrusion, preferably blown-film extrusion and/or flat-film extrusion, and in particular blown-film coextrusion and/or flat-film coextrusion, can be used here to form not only individual layers but also all of the layers of the layer composite of the invention, optionally together with further layers of the multilayer film of the invention.

Said production processes and corresponding production parameters are well known to the person skilled in the art.

The layer composite of the invention and optionally further layers of the multilayer film of the invention are preferably produced via coextrusion, and very particular preference is given here to a flat-film coextrusion process.

In one preferred embodiment, the modulus of elasticity of the water-flushable layer composite of the invention comprised in the multilayer film of the invention is at most 3000 $N/mm^2$, preferably at most 2000 $N/mm^2$, particularly preferably at most 1800 $N/mm^2$ (determinable to DIN EN ISO 527).

The multilayer film of the invention is preferably a printable film and/or transparent film and/or colored film and/or at least monolaterally siliconizable film.

In one particularly preferred embodiment, the multilayer film of the invention is composed only of the layer composite of the layers A) and B).

In another very preferred embodiment, the multilayer film of the invention is composed only of the layer composite of the layers A) and B) and of a further layer A) immediately adjacent to layer B), so that the layer B) has a layer A) at each of its surfaces.

In another very preferred embodiment, the multilayer film of the invention is composed only of the layer composite of the layers A) and B) and of a further layer B) immediately adjacent to layer B), so that the layer B) has a layer A) and, respectively, a layer B) at its surfaces.

The multilayer film of the invention, made of at least one layer A) and of at least one layer B), is suitable for producing packaging of any type, where a layer A) is always present as external layer of the packaging to protect the contents of the package.

The present invention therefore further provides the use of the multilayer film of the invention made of at least one layer A) and of at least one layer B) for producing packaging which is flushable and which, because it resists ambient moisture, can be stored.

This packaging made of the multilayer film of the invention encompassing a layer composite made of the layers A) and B), preferably made of the multilayer film of the invention composed of said layer composite or composed of the layer composite and of a further layer A) immediately adjacent to layer B), or composed of said layer composite and of a further layer B) immediately adjacent to layer B), is also provided by the present invention.

Said packaging does not only have the great advantage of being flushable with use of water, preferably of a toilet-flush, without causing blockage problems, but also in particular features relatively good resistance to ambient moisture, so that problem-free storage is possible. The examples disclose the method for testing resistance to ambient moisture.

The packaging of the invention preferably serves as protective packaging for a very wide variety of contents. These contents can be laundry detergent, dishwashing detergent, or bath salt, where these have preferably been packed in individual portions, particularly preferably in the form of tabs, and are used together with the flushable packaging.

Hygiene items, such as tampons, diapers, or sanitary napkins, can moreover be packed, preferably individually, by using the multilayer film of the invention.

Once the packaging has been removed for the use of said items, the packaging can be discarded simply by water-flush, by using a toilet-flush.

The multilayer film of the invention can moreover be a constituent of one of the said hygiene items, for example of a tampon, of a diaper, or of a sanitary napkin, to the extent that these items in their entirety, inclusive therefore of the other parts of these items, are flushable.

The multilayer film of the invention can moreover be a siliconized film, for use as release film or protective covering film on adhesive layers or adhesive areas, preferably on adhesive layers or adhesive areas on hygiene items. The thicknesses of release layers of this type are usually very small, and there is therefore no resultant effect on the flushability of the films of the invention. It is therefore preferably possible that at least one surface layer of the multilayer film of the invention has been siliconized for this purpose.

The present invention further provides a means for measuring humidity encompassing a multilayer film of the invention which encompasses a layer composite of the layers A) and B), preferably a multilayer film of the invention composed of said layer composite or composed of said layer composite and of a further layer B) immediately adjacent to layer B). The exterior layer B) of the multilayer film of the invention is preferably a siliconized layer.

EXAMPLES

The examples below serve to illustrate the invention but are not to be interpreted as restrictive.

Chemical Characterization of the Raw Materials Used:

Mowiflex TC 232: Partially hydrolyzed polyvinyl acetate from Kuraray; melt index (MFI, determined to ISO 1133): 39.8±8 g/10 min (190° C./21.6 kg); degree of hydrolysis: 88±1 mol %

DS 3507.1: Partially hydrolyzed polyvinyl acetate from Kuraray; melt index (MFI, determined to ISO 1133): 4±2 g/10 min (190° C./21.6 kg); degree of hydrolysis: 93±1 mol %

DS 2707.9: Partially hydrolyzed polyvinyl acetate from Kuraray; melt index (MFI, determined to ISO 1133): 1±1 g/10 min (190° C./21.6 kg); degree of hydrolysis: 95±1 mol %

PLA 2002: Polylactide from Natureworks

PLA DC 511: Antiblocking master batch based on polylactide from Sukano

Exceval LP DS 0806.2: Ethylene-vinyl alcohol copolymer from Kuraray

"Masterbatch 1": Blend made of Mowiflex TC 232 (25% by weight), Bioflex-F 1131 (40% by weight), calcium carbonate (34.5% by weight), surfactant (cis-13-docosenamide) (0.5% by weight)

"Masterbatch 2": Color masterbatch based on PLA

Bio-Flex F 1131: Mixture compostable to DIN EN 13432, made of biopolymers, of inorganic fillers, and of biodegradable additives UV Silikon 1624 UV-curing silicone system from Evonik

Example 1

The multilayer film is composed of the layer composite of the layers A) and B), and was produced via coextrusion. The % data below are always % by weight.

| Layer | Material | Layer thickness [m] |
|---|---|---|
| A) | DS 3507.1 (100%), | 5 |
| B) | Mowiflex TC 232 (47%) Masterbatch 1 (53%) | 25 |

Examples 2-5

Each of the multilayer films is composed of the layer composite of the layers A) and B), and of a further layer A) immediately adjacent to layer B), so that layer B) has a layer A) at each of its surfaces. Said layer composite was always produced via coextrusion. The % data below are always % by weight.

Example 2

| Layer | Material | Layer thickness [m] |
|---|---|---|
| A) | DS 3507.1 (40%), Mowiflex TC 232 (28%), Exceval LP DS 0806.2 (15.2%) PLA 2002 (15%), PLA DC 511 (1.8%) | 5 |
| B) | Mowiflex TC 232 (80%), PLA 2002 (20%) | 20 |
| A) | DS 3507.1 (40%), Mowiflex TC 232 (28%), Exceval LP DS 0806.2 (15.2%) PLA 2002 (15%), PLA DC 511 (1.8%) | 5 |

Example 3

| Layer | Material | Layer thickness [m] |
|---|---|---|
| A) | DS 3507.1 (40%), Mowiflex TC 232 (28%), Exceval LP DS 0806.2 (15.2%), PLA 2002 (15%), PLA DC 511 (1.8%) | 5 |
| B) | Masterbatch 1 (53%), Mowiflex TC 232 (45%) Masterbatch 2 (2%) | 20 |
| A) | DS 3507.1 (40%), Mowiflex TC 232 (28%), Exceval LP DS 0806.2 (15.2%), PLA 2002 (15%), PLA DC 511 (1.8%) | 5 |

Example 4

| Layer | Material | Layer thickness [m] |
|---|---|---|
| A) | Mowiflex TC 232 (43.2%), DS 3507.1 (25%), DS 2707.9 (20%), PLA 2002 (10%), PLA DC 511 (1.8%), | 5 |
| B) | Masterbatch 1 (53%), Mowiflex TC 232 (47%), | 20 |
| A) | Mowiflex TC 232 (43.2%), DS 3507.1 (25%), DS 2707.9 (20%), PLA 2002 (10%), PLA DC 511 (1.8%) | 5 |

This multilayer film is suitable by way of example for producing laundry detergent packaging.

Example 5

| Layer | Material | Layer thickness [m] |
|---|---|---|
| A) | DS 2707.9 (65.2%), Mowiflex TC 232 (18%) PLA 2002 (15%), PLA DC 511 (1.8%), | 5 |
| B) | Masterbatch 1 (53%), Mowiflex TC 232 (47%) | 20 |
| A) | DS 2707.9 (65.2%), Mowiflex TC 232 (18%) PLA 2002 (15%), PLA DC 511 (1.8%) | 5 |

This multilayer film is suitable by way of example for producing dishwashing detergent packaging.

Example 6

The multilayer film is composed of the layer composite of the layers A) and B) and of a further layer B) immediately adjacent to layer B), so that the layer B) has, at its surfaces, a layer A) and a layer B), and was produced by coextrusion. The % data below are always % by weight.

| Layer | Material | Layer thickness [m] |
|---|---|---|
| A) | DS 3507.1 (40%), Mowiflex TC 232 (28%), PLA 2002 (15%), PLA DC 511 (1.8%), Exceval LP DS 0806.2 (15.2%) | 5 |
| B) | Masterbatch 1 (53%), Mowiflex TC 232 (47%) | 15 |
| B) | Masterbatch 1 (53%), Mowiflex TC 232 (47%) | 10 |

The exterior layer B) has moreover been siliconized with UV Silikon 1624.

This multilayer film is suitable by way of example as release film or protective covering film for adhesive layers or adhesive strips on sanitary napkins.

Example 7

The multilayer film is composed of the layer composite of the layers A) and B) and of a further layer B) immediately adjacent to layer B), so that the layer B) has, at its surfaces, a layer A) and a layer B), and was produced by coextrusion. The % data below are always % by weight.

| Layer | Material | Layer thickness [m] |
|---|---|---|
| A) | DS 3507.1 (70.2%), Mowiflex TC 232 (28%) PLA DC 511 (1.8%) | 5 |
| B) | Masterbatch 1 (53%), Mowiflex TC 232 (47%) | 15 |
| B) | Masterbatch 1 (53%), Mowiflex TC 232 (47%) | 5 |

Example 8

The multilayer film is composed of the layer composite of the layers A) and B) and of a further layer A) immediately adjacent to layer B), so that layer B) has a layer A) at each of its surfaces. It was produced via coextrusion. The % data below are always % by weight.

| Layer | Material | Layer thickness [m] |
|---|---|---|
| A) | DS 3507.1 (85%), Masterbatch 1 (15%) | 5 |
| B) | Masterbatch 1 (53%), Mowiflex TC 232 (47%) | 20 |
| A) | DS 3507.1 (98.2%), PLA DC 511 (1.8%) | 5 |

Example 9

The multilayer film is composed of the layer composite of the layers A) and B) and of a further layer A) immediately adjacent to layer B), so that layer B) has a layer A) at each of its surfaces. It was produced via coextrusion. The % data below are always % by weight.

| Layer | Material | Layer thickness [m] |
|---|---|---|
| A) | DS 3507.1 (100%), | 3 |
| B) | Masterbatch 1 (53%), Mowiflex TC 232 (47%) | 24 |
| A) | DS 3507.1 (100%), | 3 |

Each of the multilayer films of example 7, example 8, and example 9 is suitable by way of example inter alia as backsheet for diapers or sanitary napkins.

Example 10

The multilayer film is composed of the layer composite of the layers A) and B) and of a further layer A) immediately adjacent to layer B), so that layer B) has a layer A) at each of its surfaces. It was produced via coextrusion. The % data below are always by weight.

| Layer | Material | Layer thickness [m] |
|---|---|---|
| A) | DS 3507.1 (88.2%), PLA 2002 (10%), PLA DC 511 (1.8%) | 5 |
| B) | Masterbatch 1 (53%), Mowiflex TC 232 (47%) | 20 |
| A) | DS 3507.1 (88.2%), PLA 2002 (10%), PLA DC 511 (1.8%) | 5 |

This multilayer film is suitable by way of example as packaging for tampons.

Flushability Testing

Test Method:

In a test method that can be used to determine whether a material or product, in particular the multilayer film or packaging of the invention, is flushable, a simple experiment is used to simulate a blockage after a water-flush. A blockage occurs if the material or product cannot be adequately comminuted by the water used for the flush. A sieve or, respectively, sieve plate with a particular pore diameter can be used as indicator for the extent of blockage. In the test method, a piece of film measuring 10×10 cm with a layer thickness of 30 µm is placed in a 1000 ml glass beaker containing 500 ml of mains water at a temperature of 23° C., and is stirred for a period of two minutes (min) by a magnetic stirrer at 500 revolutions/min. The contents of the beaker are then "filtered" through a stainless steel sieve with a pore diameter of 10 mm, and the system is checked for residues. Material that causes blockage of the pores is considered to be a residue.

The test method stated above was used to compare the flushability of the multilayer film of example 1) and, respectively, 10) with that of a two-layer comparative film 1 (e.g. as in EP 0 613 362 B1) with the same total layer thickness (table 1).

Comparative film 1 is a layer composite made of the layer A) and of the layer B). It was produced via coextrusion.

TABLE 1

| | Comparative film 1 | Film of example 1 | Film of example 10 |
|---|---|---|---|
| Structure | two-layer | two-layer | three-layer |
| Layer A) | DS 2707.9 (100%); layer thickness 10 µm | DS 3507.1 (100%); layer thickness 5 µm | DS 3507.1 (88.2%), PLA 2002 (10%), PLA DC 511 (1.8%) layer thickness 5 µm |
| Layer B) | Mowiflex TC 232 (100%); layer thickness 20 µm | Masterbatch 1 (53%), Mowiflex TC 232 (47%); layer thickness 25 µm | Masterbatch 1 (53%), Mowiflex TC 232 (47%); layer thickness 20 µm |
| Layer A) | — | — | DS 3507.1 (88.2%), PLA 2002 (10%), PLA DC 511 (1.8%) layer thickness 5 µm |
| Residues (in each case five experiments) | 5/5 | 0/5 | 0/5 |

All % data are respectively % by weight.

Determination of Resistance to Ambient Moisture (Release Effect on Contact With Low Moisture Levels)

The release effect of the release film of the invention on contact with low moisture levels is stated via the peel force in [cN/cm] for a paper of defined moisture level.

An 80 g natural paper of defined moisture level is applied here, while ensuring that no bubbles are present, to the entire width of a specimen of the film of the invention or of a comparative film, the peel force for which is to be determined. The 80 g natural paper has been wetted by applying 0.1 ml (about two drops) of distilled water centrally.

The specimen has been cut to size in such a way that there is always a 1 cm longitudinal margin of film where the defined-moisture-level 80 g natural paper is not present. The total width of the specimen is 4.5 cm (1 cm+2.5 cm+1 cm). The length of the specimen is always about 30 cm, and the test strips are stored for one minute at room temperature after the defined-moisture-level 80 g natural paper is applied.

A double-sided adhesive tape is then used to introduce the film side of the test strip into a metal rail (350×40 mm) of an electronic tensile tester, and the rail is fixed with a lower clamp. A stiff strip of film, length about 400 mm, is secured to the paper side of the test strip and fixed in the tensile tester by means of an upper clamp. The test adhesive tape is then peeled at a peel rate of 1800 mm/min at an angle of 180°, and a force diagram is plotted to determine the peel force. In each case, an average value is determined from three measurements.

The release effect on contact with low moisture levels was determined (table 2) by the test method stated above for comparative film 2-4, produced via coextrusion, and for film of example 1 of the invention.

Page 20, Table 2 (Amended):

TABLE 2

| Structure | Comparative film 2 | Comparative film 3 | Comparative film 4 | Film of example 1 |
|---|---|---|---|---|
| Layer 1 | Mowiflex TC 232 (100%); Layer thickness 30 µm | DS 3507.1 (80%) Calcium carbonate (20%); Layer thickness 5 µm | DS 3507.1 (60%) Calcium carbonate (40%); Layer thickness 5 µm | DS 3507.1 (100%); Layer thickness 5 µm |
| Layer 2 | | Masterbatch 1 (53%), Mowiflex TC 232 (47%) Layer thickness 25 µm | Masterbatch 1 (53%), Mowiflex TC 232 (47%) Layer thickness 25 µm | Masterbatch 1 (53%), Mowiflex TC 232 (47%) Layer thickness 25 µm |
| Peel force | >400 cN/cm (Non-destructive peeling impossible) | 104 cN/cm | 123 cN/cm | <10 cN/cm |

Unlike the film of example 1, comparative films 2-4 exhibit significant tack and therefore reduced release effect (=increased peel force needed) on contact with low moisture levels.

What is claimed is:

1. A multilayer film comprising an at least flushable, thermoplastic layer composite made of
    A) at least one layer which is at least comminutable via exposure to water and which does not dissolve in water having a temperature of at most 25° C. until at least two minutes have passed, or which is resistant to cold water, and which is formed of at least one at least partially hydrolyzed polyvinyl acetate with layer thickness <10 µm, and which does not comprise any solubility promoting agent, and is adjacent to layer B)
    B) at least one cold-water-soluble layer of at least one at least partially hydrolyzed polyvinyl acetate and at least one substance that promotes solubility in water, selected from the group consisting of biodegradable polymers, surfactants, inorganic pigments and fillers, said biodegradable polymers being selected from the group consisting of lactic acid (ester) homo- or copolymers, polyhydroxyalkanoates, starch, cellulose, cellulose derivates, polycaprolactones, polyesters, polyethers, ethylene-vinyl alcohol copolymers and mixtures thereof, wherein said at least one substance that promotes solubility in water includes at least one of said biodegradable polymers.

2. The multilayer film as claimed in claim 1, wherein layer A) is formed of at least one fully hydrolyzed polyvinyl acetate, at least one partially hydrolyzed polyvinyl acetate, a mixture made of at least two differently partially hydrolyzed polyvinyl acetates, or a mixture made of at least one partially hydrolyzed polyvinyl acetate and of at least one fully hydrolyzed polyvinyl acetate.

3. The multilayer film as claimed in claim 1 wherein the cold-water-soluble layer B) is formed of at least one partially hydrolyzed, cold-water-soluble polyvinyl acetate, or of a mixture made of at least two differently partially hydrolyzed, cold-water-soluble polyvinyl acetates.

4. The multilayer film as claimed in claim 1, wherein the degree of hydrolysis of the partially hydrolyzed polyvinyl acetates of the layer A) is from 85 to 98 mol %.

5. The multilayer film as claimed in claim 1, wherein the degree of hydrolysis of the partially hydrolyzed polyvinyl acetates of layer B) is from 70 to 95 mol %.

6. The multilayer film as claimed in claim 1, wherein layer B) comprises at least 50% by weight, based on the total weight of the layer B), of at least one partially hydrolyzed polyvinyl acetate.

7. The multilayer film as claimed in claim 1, wherein layer B) comprises from 0.1 to 50% by weight, based on the total weight of the layer B), of at least one substance that promotes solubility in water.

8. The multilayer film as claimed in claim 1, wherein said substance that promotes solubility in water is an inorganic pigment or filler and the inorganic pigments or filler is selected from the group consisting of silicates, carbonates and oxides.

9. The multilayer film as claimed in claim 1, wherein said substance that promotes solubility in water is a surfactant, and said surfactant is selected from the group consisting of cationic, anionic, nonionic, and amphoteric surfactants.

10. The multilayer film as claimed in claim 1, wherein layer A), also, comprises at least one substance that promotes solubility in water, selected from the group consisting of biodegradable polymers, surfactants, inorganic pigments and fillers, in an amount of from 5 to 35% by weight, based on the total weight of the layer A).

11. The multilayer film as claimed in claim 1, wherein layer A) and optionally layer B), in contact with water, can at least be comminuted to particles, where the particles at least have a size <10 mm.

12. The multilayer film as claimed in claim 1, wherein the modulus of elasticity of the flushable layer composite is at most 3000 N/mm$^2$.

13. The multilayer film as claimed in claim 1, wherein the thickness of the layer A) is from 1 µm to 9 µm.

14. The multilayer film as claimed in claim 1, wherein layer A) or layers A) represent(s) (a) surface layer(s) of the multilayer film.

15. The multilayer film as claimed in claim 1, wherein the multilayer film is a printed film and/or transparent film and/or colored film and/or siliconized film.

16. The multilayer film as claimed in claim 1, wherein the multilayer film is composed of the layer composite of the layer A) and of the layer B), or said layer composite has a further layer A) which is immediately adjacent to layer B), so that the layer B) has a layer A) at each of its surfaces, or the layer composite has a further layer B) which is immediately adjacent to layer B), so that the layer B) has, at its surfaces, a layer A) and a layer B).

17. A method for producing flushable packaging, which comprises producing said flushable packaging with the multilayer film of claim 1.

18. A flushable packaging made of the multilayer film of claim 1.

19. Tampons, diapers, or sanitary napkins packaged in the flushable packaging of claim 18.

20. A flushable protective covering for adhesive areas on hygiene items, made of the multilayer film of claim 1.

* * * * *